United States Patent
Yamamoto et al.

(10) Patent No.: US 8,568,264 B2
(45) Date of Patent: Oct. 29, 2013

(54) SPEED REDUCER, ROBOT HAND AND ROBOT

(75) Inventors: Sota Yamamoto, Matsumoto (JP); Hiroyuki Kusumoto, Suwa (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 13/425,725

(22) Filed: Mar. 21, 2012

(65) Prior Publication Data

US 2012/0244984 A1 Sep. 27, 2012

(30) Foreign Application Priority Data

Mar. 23, 2011 (JP) ................................. 2011-064014

(51) Int. Cl.
*F16H 1/32* (2006.01)

(52) U.S. Cl.
USPC ............................................................. 475/162

(58) Field of Classification Search
USPC ........................... 475/162, 178, 346, 347, 331
See application file for complete search history.

(56) References Cited

U.S. PATENT DOCUMENTS

| | | | |
|---|---|---|---|
| 3,013,447 A | 12/1961 | Hils et at. | |
| 3,430,523 A | 3/1969 | Merritt | |
| 3,994,187 A * | 11/1976 | Milenkovic | 475/168 |
| 4,612,822 A | 9/1986 | Nishikawa et al. | |
| 4,619,156 A | 10/1986 | Kiryu | |
| 4,799,396 A | 1/1989 | Ito | |
| 4,803,891 A | 2/1989 | Takahashi | |
| 4,898,065 A * | 2/1990 | Ogata et al. | 475/179 |
| 5,725,452 A * | 3/1998 | Droulon et al. | 475/162 |
| 6,021,686 A | 2/2000 | Mizoguchi | |
| 6,155,950 A | 12/2000 | Minegishi et al. | |
| 6,378,206 B1 | 4/2002 | Minegishi et al. | |
| 6,450,913 B1 | 9/2002 | Strowik et al. | |
| 6,561,306 B2 | 5/2003 | Watanabe et al. | |
| 6,857,785 B2 | 2/2005 | Takahashi et al. | |
| 7,303,499 B2 | 12/2007 | Klindworth | |
| 7,308,876 B2 | 12/2007 | Schafer et al. | |
| 7,316,211 B2 | 1/2008 | Klindworth | |
| 7,351,177 B2 * | 4/2008 | Christ | 475/168 |
| 7,360,464 B2 * | 4/2008 | Xue et al. | 74/7 E |
| 7,901,317 B2 | 3/2011 | Yamamoto et al. | |
| 8,047,943 B2 | 11/2011 | Nakamura | |
| 2010/0009801 A1 | 1/2010 | Nakamura | |
| 2010/0113206 A1 | 5/2010 | Wang et al. | |

FOREIGN PATENT DOCUMENTS

| | | |
|---|---|---|
| JP | 59-106744 | 6/1984 |
| JP | 59-231242 | 12/1984 |
| JP | 60-095235 | 5/1985 |
| JP | 63-199944 | 8/1988 |
| JP | 63-225746 | 9/1988 |
| JP | 02-120553 | 5/1990 |
| JP | 04-290643 | 10/1992 |
| JP | 04-290644 | 10/1992 |
| JP | 05-079537 | 3/1993 |

(Continued)

*Primary Examiner* — Justin Holmes
*Assistant Examiner* — David J Hlavka
(74) *Attorney, Agent, or Firm* — Harness, Dickey & Pierce, P.L.C.

(57) ABSTRACT

Through holes are formed in a revolving gear which revolves while being engaged with a ring gear, and penetration pins which are configured to extract rotation of the revolving gear are inserted in the through holes. The ring gear and the revolving gear are divided into halves in the thickness direction. Two sheets of ring gears are biased to rotate in reverse directions.

11 Claims, 7 Drawing Sheets

(56) References Cited

FOREIGN PATENT DOCUMENTS

| | | |
|---|---|---|
| JP | 05-296301 | 11/1993 |
| JP | 07-253119 | 10/1995 |
| JP | 08-240258 | 9/1996 |
| JP | 08-303558 | 11/1996 |
| JP | 11-082041 | 3/1999 |
| JP | 2000-130521 | 5/2000 |
| JP | 2000-240763 | 9/2000 |
| JP | 2001-163229 | 6/2001 |
| JP | 2002-235825 | 8/2002 |
| JP | 2002-362385 | 12/2002 |
| JP | 2003-247631 | 9/2003 |
| JP | 2003-341530 | 12/2003 |
| JP | 2004-225732 | 8/2004 |
| JP | 2006-503214 | 1/2006 |
| JP | 2006-503237 | 1/2006 |
| JP | 2006-029393 | 2/2006 |
| JP | 2007-196980 | 8/2007 |
| JP | 2007-198445 | 8/2007 |
| JP | 2007-240003 | 9/2007 |
| JP | 2008-240852 | 10/2008 |
| JP | 2009-092220 | 4/2009 |
| JP | 2009-103276 | 5/2009 |
| JP | 2009-108964 | 5/2009 |
| JP | 2009-161073 | 7/2009 |

* cited by examiner

SPEED REDUCER, ROBOT HAND AND ROBOT

BACKGROUND

1. Technical Field

The present invention relates to a speed reducer which reduces an input rotational speed to be output.

2. Related Art

Most of the power obtained from a power source such as a motor is too high in its rotational speed or is too insufficient to be used as it is. In this respect, a technique has been typically used in which the rotational speed is reduced to an appropriate rotational speed using a speed reducer to obtain a necessary rotation number and a necessary torque.

As a speed reducer which obtains a large reduction ratio, the following has been proposed. Firstly, a revolving gear which has a smaller size than a ring gear and has a smaller number of teeth (for example, by one tooth) than the ring gear is installed inside the ring gear. A circular cam is installed to be able to rotate with respect to the revolving gear in the central position of the revolving gear. A first rotational shaft is vertically installed in the circular cam in a position on the central axis of the ring gear. In the speed reducer having such a configuration, if the circular cam rotates around the central axis of the ring gear due to the first rotational shaft, the revolving gear revolves around the central axis of the ring gear while being engaged with the ring gear. Further, while the revolving gear revolves around the central axis of the ring gear by one turn, the revolving gear rotates in a direction opposite to its revolving direction by the teeth number difference with the ring gear. Thus, by extracting the rotating motion of the revolving gear, it is possible to considerably reduce the input rotational speed (rotational speed of the first rotational shaft).

Further, the rotating motion of the revolving gear is extracted by a through hole formed in the revolving gear and a penetration pin inserted in the through hole. A clearance is formed between the through hole and the penetration pin. The rotating motion of the revolving gear can be extracted by the penetration pin while the revolving motion of the revolving gear is being absorbed by the clearance. The rotating motion of the revolving gear extracted by the penetration pin in this way is output to the outside through a second rotational shaft to which the penetration pin is connected (JP-A-2008-240852).

However, in JP-A-2008-240852 as described above, there is a problem that a backlash easily occurs. That is, while the input of the first rotational shaft is output through the second rotational shaft, in addition to a normal backlash occurring in a portion where the ring gear and the revolving gear are engaged with each other, a backlash also occurs in a portion where the through hole and the penetration pin of the revolving gear are in contact with each other. The latter backlash occurs due to a manufacturing error in the speed reducer having an operation principle of JP-A-2008-240852. Further, since these two kinds of backlashes are present, a large backlash easily occurs as a whole. As a result, there is a problem that a period occurs during which an output torque is not obtained with respect to the input of the first rotational shaft, or a large rattling in the rotational direction is generated in the second rotational shaft. For this reason, the size of the backlash is inspected after assembly, and if there is a problem, the speed reducer is disassembled, a specific component is changed into a component having a slightly different dimension, the speed reducer is assembled again, and the backlash is then inspected. By repeating these processes, it is possible to achieve a speed reducer having a backlash of a predetermined size or less. Alternatively, the dimensions of all the components are measured and sorted in advance, and the speed reducer is assembled with the components combined so that the size of the backlash is within an allowable range in assembly, which results in a considerably long time for assembly.

SUMMARY

An advantage of some aspects of the invention is to provide a speed reducer which is capable of suppressing or avoiding occurrence of a backlash without sorting of component dimensions or assembly inspection, even with components having manufacturing errors.

An aspect of the invention is directed to a speed reducer including: a ring gear which is formed with a plurality of gear teeth on the inner circumference thereof; a revolving gear which is disposed to be eccentric with respect to the ring gear, is formed with a plurality of gear teeth on the outer circumference thereof and is engaged with the ring gear; a circular cam which is disposed to be able to rotate with respect to the revolving gear in a central position of the revolving gear; a first rotational shaft which is installed in the circular cam, is disposed on the central axis of the ring gear, and rotates the circular cam around the central axis to revolve the revolving gear around the central axis; a penetration pin which is inserted in a through hole formed in the revolving gear; and a second rotational shaft which is disposed on the central axis of the ring gear, is connected to the penetration pin, and outputs its rotation according to the rotation of the revolving gear, wherein the ring gear includes a first ring gear and a second ring gear which overlap with each other in a thickness direction of the gear teeth and are able to rotate in reverse directions around the central axis, wherein the revolving gear includes a first revolving gear which is engaged with the first ring gear and a second revolving gear which is engaged with the second ring gear, wherein the circular cam includes a first circular cam which is disposed to be able to rotate with respect to the first revolving gear and a second circular cam which is disposed to be able to rotate with respect to the second revolving gear, and wherein a biasing member is disposed between the first ring gear and the second ring gear and biases the first ring gear and the second ring gear in reverse directions around the central axis.

In the speed reducer with such a configuration according to this aspect of the invention, if the circular cam (the first circular cam and the second circular cam) rotates around the central axis of the ring gear through the first rotational shaft, the revolving gear (the first revolving gear and the second revolving gear) revolves around the central axis while being engaged with the ring gear (the first ring gear and the second ring gear). Further, as described later in detail, the revolving gear (the first revolving gear and the second revolving gear) rotates a little (by an angle corresponding to a teeth number difference between the ring gear and the revolving gear) in a direction which is opposite to its revolving direction while revolving. The rotating motion of the revolving gear is transmitted to the penetration pin which is inserted in the through hole of the revolving gear. The rotation of the revolving gear transmitted to the penetration pin in this way is reduced in speed with respect to an input rotation. The speed reduced rotation is output through the second rotational shaft connected to the penetration pin. Here, in the speed reducer according to this aspect of the invention, the first ring gear and the second ring gear are biased in the reverse directions by the biasing member.

According to this configuration, as the gear teeth of the first ring gear are pressed against the gear teeth of the first revolving gear and the first revolving gear rotates, the through hole of the first revolving gear is pressed against the penetration pin. Further, since the second ring gear is biased in the reverse direction to the first ring gear, as the gear teeth of the second ring gear are pressed against the gear teeth of the second revolving gear, the second revolving gear rotates in the reverse direction to the first revolving gear, and thus, the through hole of the second revolving gear is pressed against the penetration pin. In this state, if the first rotational shaft rotates to revolve the first revolving gear and the second revolving gear, even though the first rotational shaft rotates in any direction, any one of the first revolving gear and the second revolving gear is pressed against the first ring gear and the penetration pin, or the second ring gear and the penetration pin. As a result, the rotation of the first rotational shaft can be directly transmitted to the second rotational shaft, and thus, it is possible to suppress or avoid occurrence of a backlash.

Further, in the above-described speed reducer according to the aspect of the invention, the first ring gear and the second ring gear may be biased by a coil spring of which one end is coupled to the first ring gear and the other end is coupled to the second ring gear.

According to this configuration, it is possible to bias the first ring gear and the second ring gear in the reverse directions in a simple manner. Further, the first ring gear and the second ring gear pull each other by a force of the coil spring. Thus, it is possible to suppress or avoid separation of the first ring gear and the second ring gear. Thus, it is possible to simplify the structure of the speed reducer.

In the above-described speed reducer according to the aspect of the invention, the first revolving gear and the second revolving gear may be disposed to be eccentric with respect to the central axis in reverse directions at the same distance.

According to this configuration, it is possible to set the centers of the two first revolving gear and second revolving gear on the central axis. As a result, for example, even in a case where the first rotational shaft rotates at high speed, it is possible to avoid generation of vibration due to fluctuation of the centers.

Further, the above-described speed reducer according to the aspect of the invention can realize a large reduction ratio and can suppress or avoid generation of a backlash between the ring gear and the revolving gear and a backlash between the through hole of the revolving gear and the penetration pin. Thus, the speed reducer is particularly effective as a speed reducer used in combination with a robot hand or a robot.

BRIEF DESCRIPTION OF THE DRAWINGS

The invention will be described with reference to the accompanying drawings, wherein like numbers reference like elements.

FIGS. 3A to 3I are diagrams illustrating an operation principle of a speed reducer according to an embodiment of the invention.

FIGS. 4A to 4E are diagrams illustrating a mechanism in which rotation of a revolving gear can be extracted by penetration pins.

DESCRIPTION OF EXEMPLARY EMBODIMENTS

Figure 1:
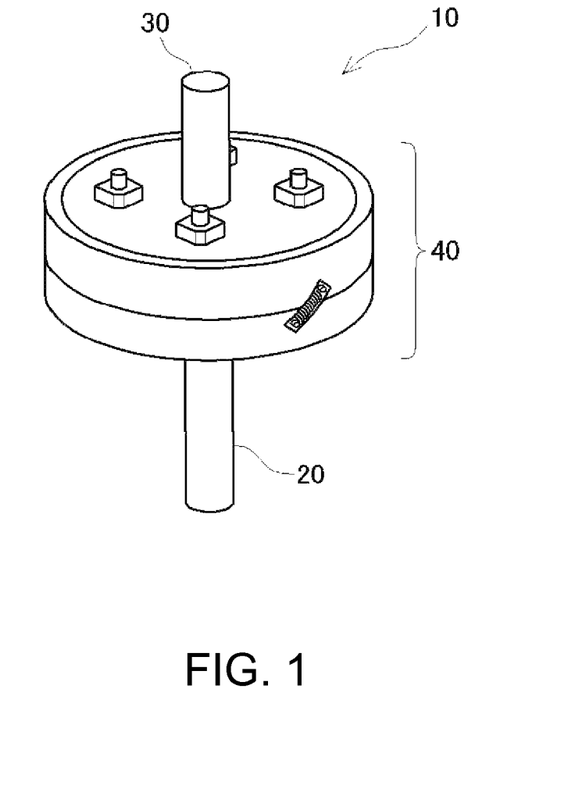
FIG. 1 is a diagram illustrating an appearance of a speed reducer according to an embodiment of the invention.

Hereinafter, embodiments will be described in the following order, in order to clarify the content of the invention.
A. Configuration of speed reducer according to embodiment of the invention
B. Principle of operation of speed reducer
C. Mechanism of suppressing or avoiding backlash
D. Modified examples
E. Application example A. Configuration of Speed Reducer According to Embodiment of the Invention FIG. 1 is a diagram illustrating an appearance of a speed reducer 10 according to an embodiment of the invention. As shown in FIG. 1, the speed reducer 10 of the present embodiment includes an input shaft 20 (first rotational shaft) which is installed on a bottom surface side of a cylindrical main body section 40, and an output shaft 30 (second rotational shaft) which is installed on an upper surface side of the main body section 40. As described later, the main body section 40 is divided into two upper and lower parts (two parts on the side of the input shaft 20 and on the side of the output shaft 30). If the input shaft 20 is rotated in a state where any one part of the main body section 40 is fixed, its rotation is reduced in speed by a mechanism in the main body section 40 and is output through the output shaft 30 which is fixed in the center of an upper cover plate 104.

Figure 2:
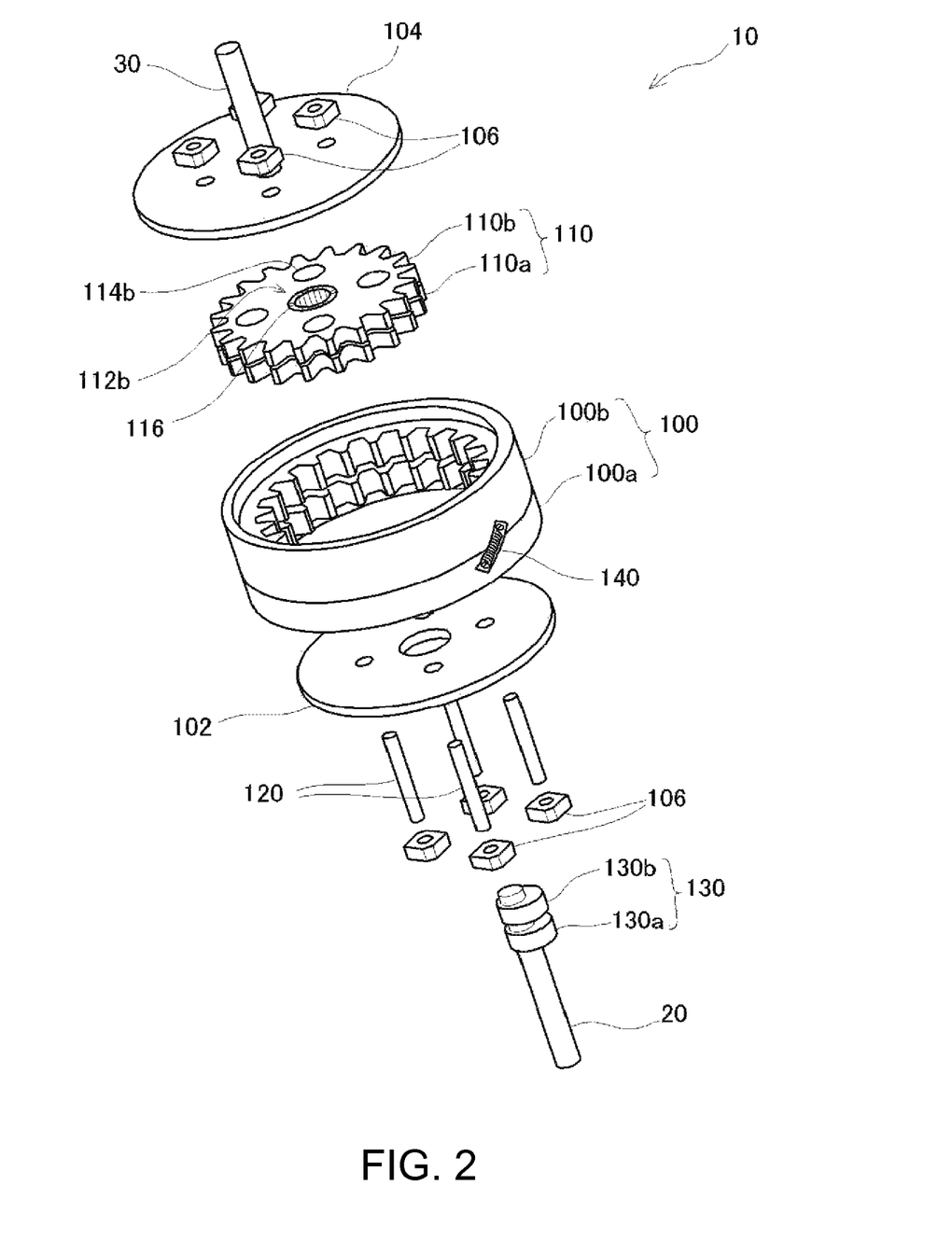
FIG. 2 is an exploded perspective view illustrating an internal structure of a speed reducer according to an embodiment of the invention.

FIG. 2 is an exploded perspective view illustrating an internal structure of the speed reducer 10 according to the present embodiment. As shown in the figure, in the speed reducer 10 of the present embodiment, a plurality of gear teeth is formed on the inner circumferential side of a cylindrical member which forms the outer circumference of the main body section 40, to form a ring gear 100. Further, as the main body section 40 is divided into two upper and lower parts, the ring gear 100 also includes a first ring gear 100a on the side of the input shaft 20 (first rotational shaft) and a second ring gear 100b on the side of the output shaft 30 (second rotational shaft). In other words, in the speed reducer 10 according to the present embodiment, one ring gear 100 is divided into two ring gears (the first ring gear 100a and the second ring gear 100b) having about half the thickness. Hereinafter, in a case where simply the expression of the ring gear 100 is used, this refers to the first ring gear 100a and the second ring gear 100b. Further, matching surfaces of the first ring gear 100a and the second ring gear 100b are formed so that one (for example, the first ring gear 100a) is fit with the other (for example, the second ring gear 100b). Further, as shown in FIG. 2, when the first ring gear 100a overlaps with the second ring gear 100b, the first ring gear 100a and the second ring gear 100b slide with respect to each other to be able to rotate. Here, the term of "fit" refers to a state where, when one matching surface is formed in a concave shape and the other matching surface is formed in a convex shape among the pair of matching surfaces which are in contact with each other and these two matching surfaces are combined with each other, a portion of the convex shape is suitably (nearly without a gap) engaged with a portion of the concave shape.

A revolving gear 110 which is smaller in size than the ring gear 100 and which is formed with a plurality of gear teeth on the outer circumferential side is installed inside the ring gear 100. The revolving gear 110 is also divided into two gears having about half the thickness, in which a first revolving gear 110a on the side of the input shaft 20 (first rotational shaft) is engaged with the first ring gear 100a, and a second revolving gear 110b on the side of the output shaft 30 (second rotational shaft) is engaged with the second ring gear 100b. Hereinafter, in a case where simply the expression of the revolving gear 110 is used, this refers to the first revolving gear 110a and the second revolving gear 110b. Further, the term of "revolution" means a motion in which an object travels around a specific point. Further, the revolving gear refers to a gear which revolves around a specific point. In the case of the present embodiment, the revolving gear 110 travels around the central axis of the ring gear 100.

A shaft hole 112 (shaft hole 112a of the first revolving gear 110a and a shaft hole 112b of the second revolving gear 110b) is formed in the center of the revolving gear 110 (the first revolving gear 110a and the second revolving gear 110b). Further, a first eccentric cam 130a of a circular shape which is installed in the input shaft 20 is inserted in the shaft hole 112a of the first revolving gear 110a to be able to rotate through a bearing 116. Similarly, a second eccentric cam 130b of a circular shape which is installed in the input shaft 20 is inserted in the shaft hole 112b of the second revolving gear 110b through the bearing 116. In FIG. 2, since the shaft hole 112a of the first revolving gear 110a is hidden by the second revolving gear 110b, only the shaft hole 112b of the second revolving gear 110b is shown. Hereinafter, in a case where simply the expression of the eccentric cam 130 is used, this refers to the first eccentric cam 130a and the second eccentric cam 130b. Further, in the present embodiment, for ease of understanding, it is assumed that the first eccentric cam 130a and the second eccentric cam 130b are eccentric in the same direction.

Further, through holes 114 (through holes 114a of the first revolving gear 110a and through holes 114b of the second revolving gear 110b) are installed in four locations on a concentric circle with respect to the center of the revolving gear 110, in the revolving gear 110 (the first revolving gear 110a and the second revolving gear 110b). In FIG. 2, since the through holes 114a of the first revolving gear 110a are hidden by the second revolving gear 110b, only the through holes 114b of the second revolving gear 110b are shown. Further, a penetration pin 120 for extracting the rotating motion of the revolving gear 110 is inserted in each through hole 114a and each through hole 114b. A method of extracting the rotating motion of the revolving gear 110 by the penetration pin 120 will be described later. These penetration pins 120 are attached to the lower cover plate 102 which forms a bottom surface of the main body section 40 at their lower end portions, and are attached to an upper cover plate 104 which forms a top surface of the main body section 40 by a nut 106 at their upper end portions.

Further, a coil spring 140 is installed in a pulled and inclined manner between the outer circumference of the first ring gear 100a and the outer circumference of the second ring gear 100b. Thus, a force which pulls the matching surfaces so as not to be separated from each other and rotates the matching surfaces in reverse directions acts between the first ring gear 100a and the second ring gear 100b. In FIG. 2, the coil spring 140 is shown only in one location on a front side, but the coil spring 140 is also installed in an opposite location (location which is rotation-symmetric with reference to the central axis of the ring gear 100).

B. Operation Principle of Speed Reducer

FIGS. 3A to 3I are diagrams illustrating an operation principle of the speed reducer 10 of the present embodiment. As described above with reference to FIG. 2, in the speed reducer 10 of the present embodiment, the ring gear 100 includes the first ring gear 100a and the second ring gear 100b, which are operated in a similar way. Here, for ease of understanding, in FIGS. 3A to 3I, it is assumed that the first ring gear 100a and the second ring gear 100b are integrated to form the ring gear 100. Further, in the case of the revolving gear 110, the revolving gear 110 similarly includes the first revolving gear 110a and the second revolving gear 110b, which are operated in a similar way. For ease of understanding, in FIGS. 3A to 3I, it is assumed that the first revolving gear 110a and the second revolving gear 110b are integrated to form the revolving gear 110.

As described above, the revolving gear 110 which is smaller in size than the ring gear 100 is installed inside the ring gear 100, and the ring gear 100 and the revolving gear 110 are engaged with each other in one location. Accordingly, the revolving gear 110 is in a state of being eccentric with respect to the central position of the ring gear 100. Further, the shaft hole 112 is formed in the center of the revolving gear 110, and the eccentric cam 130 is inserted in the shaft hole 112 through the bearing 116 (see FIG. 2). Thus, if the input shaft 20 rotates, the eccentric cam 130 rotates, and thus, the revolving rear 110 revolves around the input shaft 20 (and the central axis of the ring gear 100). Further, the revolving gear 110 and the eccentric cam 130 are able to rotate with respect to each other through the bearing 116, and the revolving gear 110 is engaged with the ring gear 100 by the gear teeth. Thus, while rotating by the engagement with the gear teeth of the ring gear 100, the revolving gear 110 revolves around the input shaft 20 (and the central axis of the ring gear 100). Here, the term of "rotation" means a motion in which a specific object rotates using an axis which passes through an internal point (for example, the center or weighted center) of the specific object as a central axis. In the case of the present embodiment, the rotation of the revolving gear 110 means that the revolving gear 110 rotates using an axis which passes the center of the revolving gear 110 (not shown) as a central axis.

Figure 3:
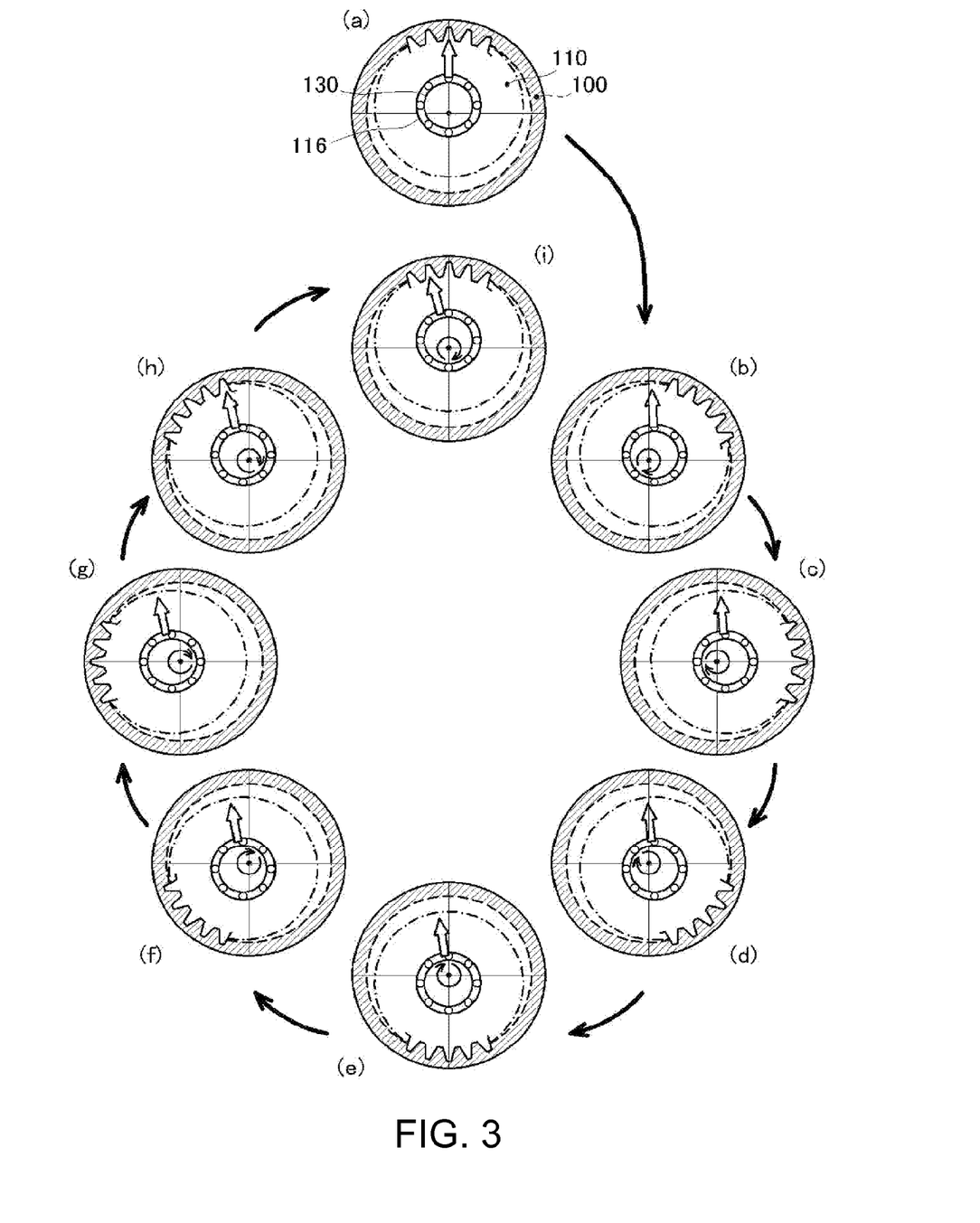

FIG. 3A shows a state where the eccentric cam 130 is eccentric on the upper side of the figure and accordingly the revolving gear 110 is engaged with the ring gear 100 on the upper side of the figure. In FIGS. 3A to 3I, an arrow is drawn on a side surface of the revolving gear 110 to confirm a state where the revolving gear 110 rotates. This arrow indicates a central uppermost portion in the figure in the state of FIG. 3A.

If the input shaft 20 rotates by 45 degrees in the clockwise direction from the state shown in FIG. 3A, the revolving gear 110 also revolves by 45 degrees in the clockwise direction by the motion of the eccentric cam 130. Further, since the revolving gear 110 is engaged with the ring gear 100, the revolving gear 110 rotates in the anticlockwise direction by an angle corresponding to the number of gear teeth. As a result, the revolving gear 110 enters into a state shown in FIG. 3B. As is obvious from comparison of FIG. 3A and FIG. 3B, as the eccentric cam 130 rotates by 45 degrees in the clockwise direction, the revolving gear 110 also revolves by 45 degrees in the clockwise direction, and moves to an eccentric position on an upper right side in the figure. Further, the direction of the arrow drawn in the revolving gear 110 indicates an approximately uppermost portion in the figure in a similar way to FIG. 3A. It can be considered that this is caused because the rotation in the anticlockwise direction generated in the revolving gear 110 by the engagement with the ring gear 100 approximately negates the revolution in the clockwise direction when the revolving gear 110 revolves in the clockwise direction.

If the input shaft 20 further rotates by 45 degrees in the clockwise direction from the state shown in FIG. 3B, the revolving gear 110 moves to a position shown in FIG. 3C. This state is a state where the revolving gear 110 revolves by 90 degrees in the clockwise direction with respect to the state shown in FIG. 3A. Further, as the revolving gear 110 revolves to this position while being engaged with the ring gear 100, the revolving gear 110 rotates in the anticlockwise direction by an angle corresponding to the number of gear teeth. Further, the direction of the arrow drawn in the revolving gear 110 is still in a state of indicating an approximately uppermost portion in the figure, in a similar way to FIG. 3B.

If the input shaft 20 further rotates in the clockwise direction from the state shown in FIG. 3C, the revolving gear 110 moves to a state shown in FIG. 3D, a state shown in FIG. 3E, a state shown in FIG. 3F, and a state shown in FIG. 3H. Here, if the input shaft 20 rotates just one turn, it enters into a state shown in FIG. 3I. Further, the direction of the arrow drawn in the revolving gear 110 rotates in the anticlockwise direction by one gear tooth, compared with the state of FIG. 3A. That is, the revolution in the clockwise direction and the rotation in the anticlockwise direction generated in the revolving gear 110 have angles which are approximately negated with respect to each other. However, strictly speaking, the angle of the rotation is larger than that of the revolution by one gear tooth for each revolution. This is because, since the number of gear teeth of the revolving gear 110 is smaller than the number of gear teeth of the ring gear 100 by one tooth, the revolving gear 110 should rotate in the anticlockwise direction once and then further by one tooth so that the revolving gear 110 revolves once in the clockwise direction while being engaged with the ring gear 100.

In this way, in the speed reducer 10 according to the present embodiment, if the input shaft 20 rotates once, the revolving gear 110 rotates reversely by the number of gear teeth corresponding to the gear teeth number difference with the ring gear 100. For example, if the number of gear teeth of the ring gear 100 is 50 and the number of gear teeth of the revolving gear 110 is 49, the revolving gear 110 rotates reversely by one fiftieth rotation whenever the input shaft 20 rotates once (accordingly, 360 degrees/50=7.2 degrees).

Further, the motion of the revolving gear 110 when the input shaft 20 rotates may be performed as follows. Firstly, if the input shaft 20 rotates, the revolving gear 110 revolves around the input shaft 20 (and the central axis of the ring gear 100) by the eccentric cam 130. On the other hand, since the revolving gear 110 is engaged with the ring gear 100, the revolving gear 110 rotates while rolling on the ring gear 100.

Here, the revolving gear 110 is formed to be slightly smaller in size than the ring gear 100. Accordingly, even though the revolving gear 110 does not approximately rotate in reality, the revolving gear 110 can roll on the ring gear 100, only by slightly moving the revolving gear 110 in parallel. For example, in the states shown in FIGS. 3A and 3B, the revolving gear 110 scarcely rotates and slightly moves in a lower right direction. Nevertheless, the position where the revolving gear 110 is engaged with the ring gear 100 moves by 45 degrees from the central position of the ring gear 100. That is, the revolving gear 110 rolls on the ring gear 100. Similar to the states shown in FIGS. 3B and 3C, the revolving gear 110 scarcely rotates and slightly moves in the approximately lower right direction. Nevertheless, the position where the revolving gear 110 is engaged with the ring gear 100 further moves by 45 degrees. That is, the revolving gear 110 rolls on the ring gear 100.

In this way, if the revolving gear 110 is formed to be slightly smaller in size than the ring gear 100, it is possible to allow the revolving gear 110 to roll on the ring gear 100 without rotation, only by moving (fluctuating) the revolving gear 110 to vibrate and rotate. Further, during a period when the revolving gear 110 returns to the original position (for example, the position shown in FIG. 3A or 3I), only rotation of the angle corresponding to the gear teeth number difference between the ring gear 100 and the revolving gear 110 is generated.

As described above, even though the revolving gears 110 of the present embodiment revolve, the revolving gears 110 only slightly fluctuate inside the ring gear 100 while slightly rotating. In this view, it can be considered that the rotation of the revolving gear 110 is extracted by the penetration pin 120. That is, as shown in FIG. 2, four through holes 114 are installed in the revolving gear 110 of the present embodiment, and the penetration pins 120 are respectively inserted in the through holes 114. Here, if the size of the though hole 114 is set to be larger than the diameter of the penetration pin 120 to a certain degree, it is possible to absorb the fluctuating motion of the revolving gear 110 inside the ring gear 100 by the clearance between the through hole 114 and the penetration pin 120, thereby extracting only the rotation of the revolving gear 110. Hereinafter, this will be described.

FIGS. 4A to 4E are diagrams illustrating a state where the rotation of the revolving gear 110 is extracted by the penetration pin 120. For ease of understanding, in FIGS. 4A to 4E, it is also assumed that the first ring gear 100a and the second ring gear 100b are integrated to form the ring gear 100, and the first revolving gear 110a and the second revolving gear 110b are integrated to form the revolving gear 110.

Figure 4:
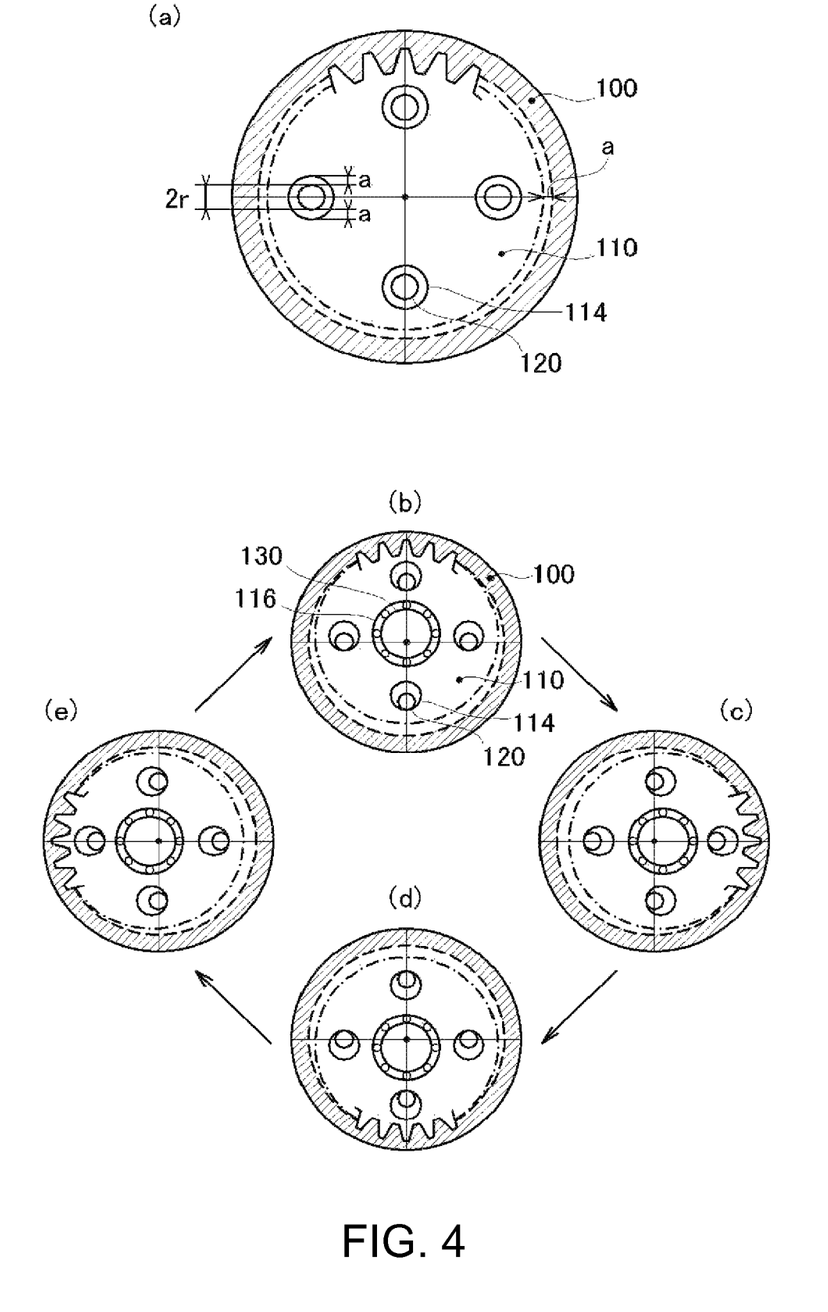

Firstly, the size of the through hole 114 which is formed in the revolving gear 110 will be described. As shown in FIG. 4A, when the central position of the revolving gear 110 coincides with the central position of the ring gear 100, the through hole 114 overlaps with the position of the penetration pin 120 and is formed to be larger than the penetration pin 120 by a radius "a". Here, "a" represents the amount of eccentricity of the revolving gear 110 with respect to the central position of the ring gear 100.

The revolving gear 110 which is formed with the through holes 114 in this way is eccentric toward the upper side in the figure by the eccentric cam 130. Then, since the revolving gear 110 is eccentric toward the upper direction by the length "a", as shown in FIG. 4B, the lower side of the through hole 114 enters into contact with the outer circumference of the penetration pin 120. Further, if the revolving gear 110 is eccentric toward the right side in the figure by the eccentric cam 130, as shown in FIG. 4C, the left side of the through hole 114 enters into contact with the penetration pin 120. Similarly, if the revolving gear 110 is eccentric toward the lower side in the figure, as shown in FIG. 4D, the upper side of the through hole 114 enters into contact with penetration pin 120, and if the revolving gear 110 is eccentric toward the left side in the figure, as shown in FIG. 4E, the through hole 114 and the penetration pin 120 are in contact with each other on the right side of the through hole 114.

In this way, in the speed reducer 10 of the present embodiment, by setting the size of the through hole 114 to be larger than the penetration pin 120 by the size corresponding to the amount of eccentricity "a", it is possible to absorb the fluctuating motion of the revolving gear 110 inside the ring gear 100. Here, "setting the size of the through hole 114 to be larger than the penetration pin 120 by the size corresponding to the amount of eccentricity "a"" means that the radius of the through hole 114 is set to be larger than the radius of the penetration pin 120 by the amount of eccentricity "a" or the diameter of the through hole 114 is set to be two times (2a) the amount of eccentricity "a" larger than the diameter of the penetration pin 120. On the other hand, if the revolving gear 110 rotates, since the position of the through hole 114 moves, this motion is transmitted to the penetration pin 120. Thus, it is possible to extract the rotating motion of the revolving gear 110. The rotation of the extracted revolving gear 110 in this way is transmitted to the upper cover plate 104 and the lower cover plate 102 (see FIG. 2) of the main body section 40 to which the penetration pin 120 is attached. As a result, the rotation of the revolving gear 110 from the output shaft 30 which is fixed to the upper cover plate 104 is output to the outside of the speed reducer 10.

Thus, in the speed reducer 10 having such an operational principle in the present embodiment, if the input shaft 20 rotates, the revolving gear 110 revolves due to the engagement of the revolving gear 110 and the ring gear 100, and the rotation of the revolving gear 110 at that time is extracted by the penetration pins 120 which pass the through holes 114 of the revolving gear 110 and is output through the output shaft 30. Accordingly, while the rotation of the input shaft 20 is being output through the output shaft 30, in addition to a backlash between the revolving gear 110 and the ring gear 100, a backlash is also generated between the through hole 114 and the penetration pin 120. Thus, a large backlash is easily generated in the entire speed reducer 10. As a result, there is a problem that a period is generated when an output torque of the output shaft 30 cannot be obtained even though the input shaft 20 is rotated, or the output shaft 30 rattles even though the input shaft 20 is stopped. However, in the speed reducer 10 according to the present embodiment, as described with reference to FIG. 2, since the ring gear 100 includes two gears of the first ring gear 100a and the second ring gear 100b, the revolving gear 110 includes two gears of the first revolving gear 110a and the second revolving gear 110b, and the first ring gear 100a and the second ring gear 100b are biased by the coil spring 140 to rotate in reverse directions, it is possible to suppress or prevent the generation of the backlash. Hereinafter, a mechanism of suppressing or preventing the generation of the backlash by the speed reducer 10 of the present embodiment will be described.

C. Mechanism of Suppressing or Preventing Backlash

Figure 5:
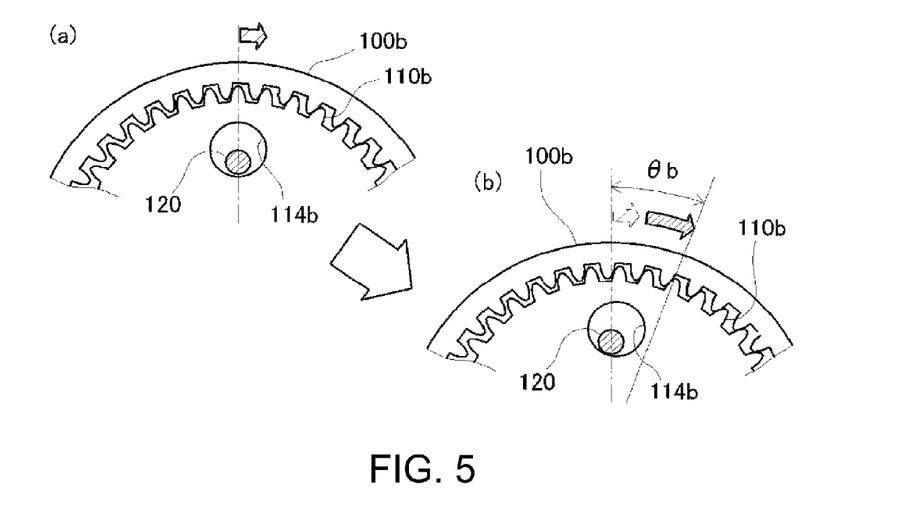
FIGS. 5A and 5B are diagrams illustrating a mechanism in which generation of a backlash is suppressed or avoided in a speed reducer according to an embodiment of the invention.
Figure 6:
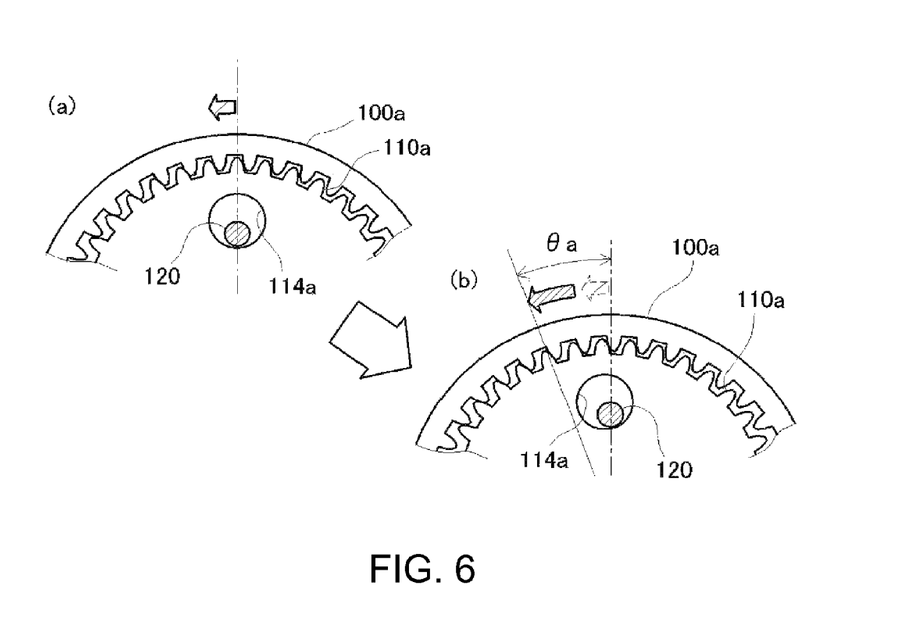
FIGS. 6A and 6B are diagrams illustrating a mechanism in which generation of a backlash is suppressed or avoided in a speed reducer according to an embodiment of the invention.

FIGS. 5A and 5B and FIGS. 6A and 6B are diagrams illustrating a mechanism of suppressing or preventing the generation of the backlash by the speed reducer 10 of the present embodiment. In the speed reducer 10 of the present embodiment, in order to suppress or prevent the generation of the backlash, the coil spring 140 biases the first ring gear 100a and the second ring gear 100b in reverse directions. FIGS. 5A and 5B show the motion of the second ring gear 100b which is biased by the coil spring 140, and FIGS. 6A and 6B show the motion of the first ring gear 100a. In the example shown in FIG. 2, since the upper second ring gear 100b is biased in the clockwise direction and the lower first ring gear 100a is biased in the anticlockwise direction, it also is assumed that the second ring gear 100b and the first ring gear 100a are biased in these directions, in FIGS. 5A and 5B and FIGS. 6A and 6B.

If the backlash is present between the second ring gear 100b and the second revolving gear 110b, the second ring gear 100b is biased in the clockwise direction by the coil spring 140, so that the gear teeth of the second ring gear 100b are in contact with the gear teeth of the second revolving gear 110b. FIG. 5A shows a state where as the second ring gear 100b is biased in the clockwise direction, and the gear teeth of the second ring gear 100b are in contact with the gear teeth of the second revolving gear 110b.

Further, if the backlash is present between the through hole 114b of the second revolving gear 110b and the penetration pin 120, the second revolving gear 110b rotates in the clockwise direction while being pressed by the second ring gear 100b, so that the through hole 114b of the second revolving gear 110b is in contact with the penetration pin 120.

FIG. 5B shows a state where the through hole 114b of the second revolving gear 110b is in contact with the penetration pin 120. A rotational angle θb of the second ring gear 100b at that time becomes a rotational angle obtained by adding a rotational angle corresponding to the backlash between the second ring gear 100b and the second revolving gear 110b to a rotational angle corresponding to the backlash between the through hole 114b of the second revolving gear 110b and the penetration pin 120. In FIGS. 5A and 5B, the rotational angle θb of the second ring gear 100b and the second revolving gear 110b is shown to be larger than its real angle.

This is also similarly applied to the first ring gear 100a which is disposed below the second ring gear 100b. That is, the first ring gear 100a is biased in the anticlockwise direction by the coil spring 140, so that the gear teeth of the first ring gear 100a are in contact with the gear teeth of the first revolving gear 110a, as shown in FIG. 6A. Further, the first revolving gear 110a rotates in the anticlockwise direction while being pressed to the first ring gear 100a, and as shown in FIG. 6B, the through hole 114a of the first revolving gear 110a is in contact with the penetration pin 120. A rotational angle θa of the first ring gear 100a at that time becomes a rotational angle obtained by adding a rotational angle corresponding to the backlash between the first ring gear 100a and the first revolving gear 110a to a rotational angle corresponding to the backlash between the through hole 114a of the first revolving gear 110a and the penetration pin 120. In FIGS. 6A and 6B, the rotational angle θa of the first ring gear 100a and the first revolving gear 110a is shown to be larger than its real angle.

Hereinabove, the motion (see FIGS. 5A and 5B) of the second revolving gear 110b due to the rotation of the second ring gear 100b in the clockwise direction and the motion (see FIGS. 6A and 6B) of the first revolving gear 110a due to the rotation of the first ring gear 100a in the anticlockwise direction have been separately described. However, in reality, since the second ring gear 100b and the first ring gear 100a are biased in a direction where they pull each other, these motions are generated at the same time. As a result, the penetration pin 120 is in a state of being pinched from the opposite sides by the through hole 114b of the second revolving gear 110b and the through hole 114a of the first revolving gear 110a. Further, in this state, as described later, the backlash between the ring gear 100 and the revolving gear 110, and the backlash between the revolving gear 110 and the penetration pin 120 are all removed.

For example, it is assumed that the input shaft 20 rotates to rotate the revolving gear 110 (the first revolving gear 110a and the second revolving gear 110b) in the clockwise direction. In this case, as shown in FIGS. 6A and 6B, since the first ring gear 100a is in contact with the first revolving gear 110a, the revolution of the first revolving gear 110a in the clockwise direction is directly converted into the rotation of the first revolving gear 110a in the anticlockwise direction, by the engagement of the gears. Further, since the through hole 114a of the first revolving gear 110a is in contact with the penetration pin 120, the rotation of the first revolving gear 110a in the anticlockwise direction is directly transmitted to the penetration pin 120.

Further, it is assumed that when the revolving gear 110 (the first revolving gear 110a and the second revolving gear 110b) rotates in the clockwise direction, its rotational direction is rapidly reversed. While the revolving gear 110 rotates in the clockwise direction, as show in FIGS. 5A and 5B, the second revolving gear 110b is in contact with the second ring gear 100b. Accordingly, if the rotational direction of the revolving gear 110 is reversed and rotates in the anticlockwise direction, the revolution of the second revolving gear 110b in the anticlockwise direction is directly converted into the rotation of the second revolving gear 110b in the clockwise direction, by the engagement of the second revolving gear 110b and the second ring gear 100b. Further, since the through hole 114b of the second revolving gear 110b and the penetration pin 120 are in contact with each other, the rotation of the second revolving gear 110b in the clockwise direction is transmitted to the penetration pin 120.

In this way, even in a case where the input shaft 20 is rotated in any direction, the rotation is directly converted into the rotating motion of the first revolving gear 110a or the second revolving gear 110b, by any one of the engagement of the first ring gear 100a and the first revolving gear 110a and the engagement of the second ring gear 100b and the second revolving gear 110b. Further, the rotating motion of the first revolving gear 110a or the second revolving gear 110b is directly transmitted to the penetration pin 120, by the through hole 114a of the first revolving gear 110a or the through hole 114b of the second revolving gear 110b. Thus, the backlash is not generated in the speed reducer 10 of the present embodiment at all.

Further, according to the speed reducer 10 of the present embodiment, even in a case where dimensional accuracy of the ring gear 100 (the first ring gear 100a or the second ring gear 100b), the revolving gear 110 (the first revolving gear 110a or the second ring gear 110b), or the penetration pin 120 is poor, the backlash is prevented from being generated in the speed reducer 10, only by increasing the total rotational angle (=θa+θb) of the first ring gear 100a and the second ring gear 100b.

Further, as described above with reference to FIGS. 4A to 4E, the position where the penetration pin 120 is in contact with the through hole 114 moves according to the revolution of the revolving gear 110. Accordingly, in a case where the through hole 114 (or the penetration pin 120) is not formed in a perfect circular shape, the amount of backlash is changed according to the position of the revolving gear 110 which is revolving. However, in the speed reducer 10 of the present embodiment, even in such a case, only be changing the total rotational angle (=θa+θb) of the first ring gear 100a and the second ring gear 100b in accordance with the revolution of the revolving gear 110, the backlash is prevented from being generated.

D. Modified Examples

In the above-described embodiment, the first eccentric cam 130a and the second eccentric cam 130b which are installed in the input shaft 20 are eccentric in the same direction, and accordingly, the first revolving gear 110a and the second revolving gear 110b are also eccentric with respect to the first ring gear 100a and the second ring gear 100b in the same direction. However, the first eccentric cam 130a and the second eccentric cam 130b (accordingly, the first revolving gear 110a and the second revolving gear 110b) may be eccentric in reverse directions.

Figure 7A:
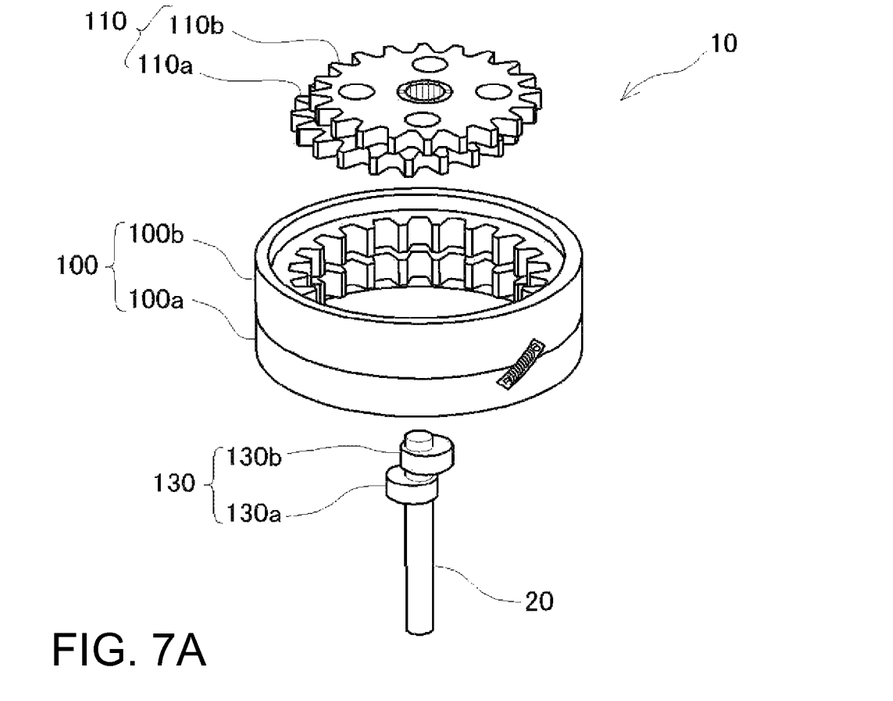
FIGS. 7A and 7B are diagrams illustrating a main part of a speed reducer according to a modified example, in which a first revolving gear and a second revolving gear are disposed to have reverse phases.
Figure 7B:
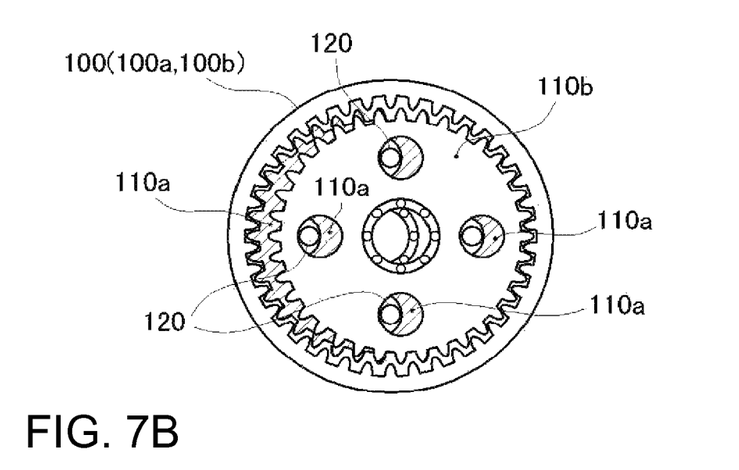

FIGS. 7A and 7B are diagrams illustrating a main part of the speed reducer 10 according to a modified example, in which the first eccentric cam 130a and the second eccentric cam 130b are eccentric in the reverse directions and are assembled. FIG. 7A is an exploded perspective view illustrating a state where the first revolving gear 110a, the second revolving gear 110b and the input shaft 20 are assembled to the first ring gear 100a and the second ring gear 100b. In FIG. 7A, the penetration pin 120, the lower cover plate 102, the upper cover plate 104, and the like are not shown. In FIG. 7A, the second revolving gear 110b which is installed on the upper side in the figure is eccentric to the right side, and accordingly is engaged with the second ring gear 100b on the right side of the second revolving gear 110b. Further, the first revolving gear 110a which is installed on the lower side in the figure is eccentric to the left side, and accordingly is engaged with the first ring gear 100a on the left side of the first revolving gear 110a.

FIG. 7B shows a state where the first revolving gear 110a and the second revolving gear 110b are assembled to the first ring gear 100a and the second ring gear 100b when seen from the top (side of the second revolving gear 110b). In FIG. 7B, the input shaft 20 is not shown, and the penetration pin 120 is instead shown. As shown in the figure, the second revolving gear 110b which is shown on the front side is eccentric to the right side, and is engaged with the second ring gear 100b on the right side. Further, the first revolving gear 110a which is shown on the back side in the figure is eccentric to the left side, and is engaged with the first ring gear 100a on the left side.

As described above, if the first revolving gear 110a and the second revolving gear 110b are eccentric in the reverse directions for assembly, it is possible to achieve the following advantages. That is, as described above with reference to FIGS. 4A to 4E, if the input shaft 20 rotates once, the revolving gear 110 (the first revolving gear 110a and the second revolving gear 110b) revolves once around the input shaft 20. Accordingly, if the input shaft 20 rotates at high speed, the revolving gear 110 (the first revolving gear 110a and the second revolving gear 110b) revolves around the input shaft 20 at high speed, and thus, a motion in which the center of gravity is fluctuated is generated in the speed reducer 10. On the other hand, as in the modified example shown in FIGS. 7A and 7B, if the first revolving gear 110a and the second revolving gear 110b are eccentric in the reverse directions, the combined center of gravity of the first revolving gear 110a and the second revolving gear 110b is present on the central axis of the input shaft 20. Thus, even though the input shaft 20 rotates at high speed and the first revolving gear 110a and the second revolving gear 110b revolve at high speed, the motion in which the center of gravity is fluctuated is prevented. As a result, even though the input shaft 20 rotates at high speed, it is possible to provide the speed reducer 10 with low vibration.

E. Application Example

As described above, in the speed reducer 10 according to the present embodiment, it is possible to realize a large speed reduction ratio and to prevent a backlash. Thus, the speed reducer 10 according to the present embodiment is particularly suitable as a speed reducer which is applied to a joint of a robot, a joint of a robot hand, or the like.

Figure 8A:
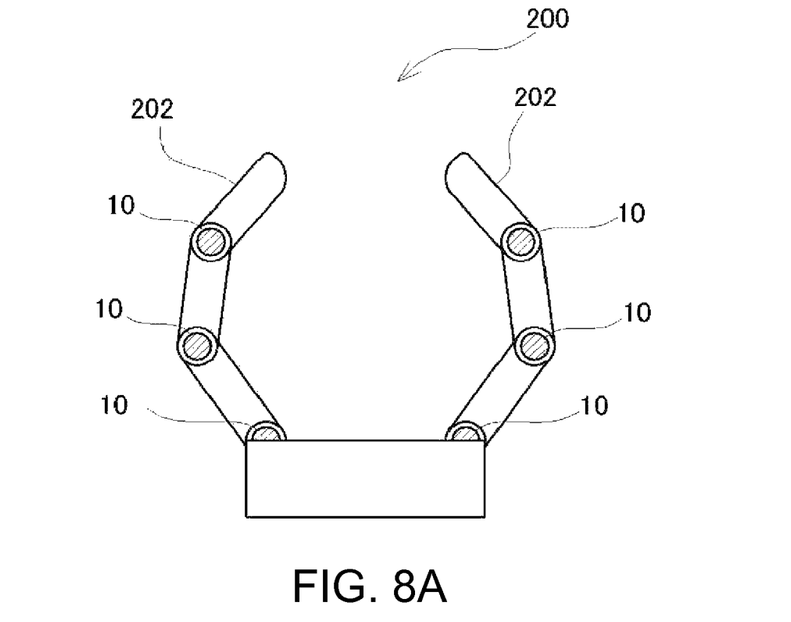
FIGS. 8A and 8B are diagrams illustrating a state where a speed reducer according to an embodiment of the invention is assembled to a joint or the like of a robot hand.
Figure 8B:
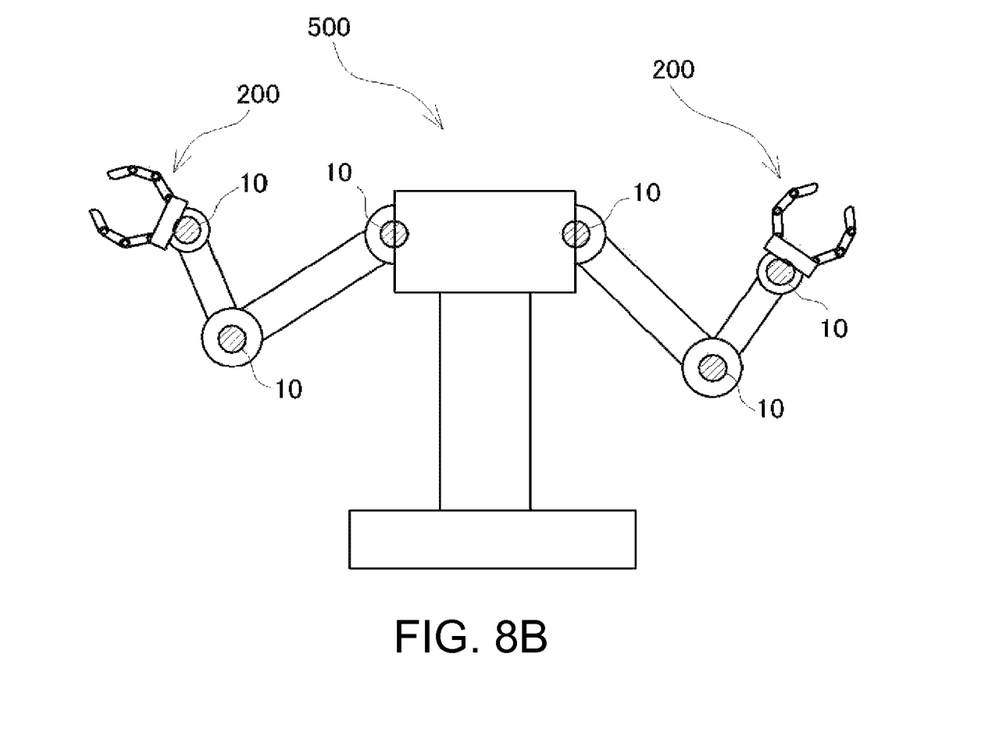

FIGS. 8A and 8B are diagrams illustrating a state where the speed reducer 10 according to the present embodiment is assembled in a joint or the like of a robot hand. In a robot hand 200 shown in FIG. 8A, joints are installed at three locations of each of two fingers 202 which face each other, and the speed reducers 10 are assembled to the joints. Further, in a robot 500 shown in 8B, the speed reducers 10 are assembled in a connection portion between an arm of the robot and the robot hand 200, an elbow of the arm, a base of the arm, or the like. Thus, an output delay of the joints in which the speed reducers 10 are assembled or rattling of the output shaft 30 is prevented, thereby making it possible to smooth the motion of the joints.

Hereinbefore, the speed reducer according to the present embodiment has been described, but the invention is not limited thereto and may have a variety of embodiments in a range without departing from the spirit of the invention.

For example, in the above-described embodiment or the modified example, the first ring gear 100a and the second ring gear 100b are biased in reverse directions so that they pull each other as the coil spring 140 is installed in a pulled manner. However, since it is sufficient that the first ring gear 100a and the second ring gear 100b are biased in the reverse directions, they should not necessarily be biased so that they pull each other. For example, by assembling the coil spring 140 in a state of being compressed, the first ring gear 100a and the second ring gear 100b may be biased to be distant from each other.

The entire disclosure of Japanese Patent Application No. 2011-064014, filed Mar. 23, 2011 is expressly incorporated by reference herein.

What is claimed is:

1. A speed reducer comprising:
a ring gear which is formed with a plurality of gear teeth on the inner circumference thereof;
a revolving gear which is disposed to be eccentric with respect to the ring gear, is formed with a plurality of gear teeth on the outer circumference thereof and is engaged with the ring gear;
a circular cam which is disposed to be able to rotate with respect to the revolving gear in a central position of the revolving gear;
a first rotational shaft which is installed in the circular cam, is disposed on the central axis of the ring gear, and rotates the circular cam around the central axis to revolve the revolving gear around the central axis;
a penetration pin which is inserted in a through hole formed in the revolving gear; and
a second rotational shaft which is disposed on the central axis of the ring gear, is connected to the penetration pin, and outputs its rotation according to the rotation of the revolving gear,
wherein the ring gear includes a first ring gear and a second ring gear which overlap with each other in a thickness direction of the gear teeth and are able to rotate in reverse directions around the central axis,
wherein the revolving gear includes a first revolving gear which is engaged with the first ring gear and a second revolving gear which is engaged with the second ring gear,
wherein the circular cam includes a first circular cam which is disposed to be able to rotate with respect to the first revolving gear and a second circular cam which is disposed to be able to rotate with respect to the second revolving gear, and
wherein a biasing member is disposed between the first ring gear and the second ring gear and biases the first ring gear and the second ring gear in reverse directions around the central axis.

2. The speed reducer according to claim 1,
wherein the biasing member is a coil spring of which one end is coupled to the first ring gear and the other end is coupled to the second ring gear.

3. The speed reducer according to claim 1,
wherein the first revolving gear and the second revolving gear are disposed to be eccentric with respect to the central axis in reverse directions at the same distance.

4. A robot hand comprising the speed reducer according to claim 1.

5. A robot hand comprising the speed reducer according to claim 2.

6. A robot hand comprising the speed reducer according to claim 3.

7. A robot comprising the speed reducer according to claim 1.

8. A robot comprising the speed reducer according to claim 2.

9. A robot comprising the speed reducer according to claim 3.

10. A robot comprising:
a ring gear which is formed with a plurality of gear teeth on the inner circumference thereof;
a revolving gear which is disposed to be eccentric with respect to the ring gear, is formed with a plurality of gear teeth on the outer circumference thereof and is engaged with the ring gear;
a circular cam which is disposed to be able to rotate with respect to the revolving gear in a central position of the revolving gear;
a first rotational shaft which is installed in the circular cam, is disposed on the central axis of the ring gear, and rotates the circular cam around the central axis to revolve the revolving gear around the central axis;
a penetration pin which is inserted in a through hole formed in the revolving gear; and
a second rotational shaft which is disposed on the central axis of the ring gear, is connected to the penetration pin, and outputs its rotation according to the rotation of the revolving gear,
wherein the ring gear includes a first ring gear and a second ring gear which overlap with each other in a thickness direction of the gear teeth and are able to rotate in reverse directions around the central axis,
wherein the revolving gear includes a first revolving gear which is engaged with the first ring gear and a second revolving gear which is engaged with the second ring gear,
wherein the circular cam includes a first circular cam which is disposed to be able to rotate with respect to the first revolving gear and a second circular cam which is disposed to be able to rotate with respect to the second revolving gear, and
wherein a biasing member is disposed between the first ring gear and the second ring gear and biases the first ring gear and the second ring gear in reverse directions around the central axis.

11. The robot according to claim 10,
wherein the biasing member is a coil spring of which one end is coupled to the first ring gear and the other end is coupled to the second ring gear.

* * * * *